US012386374B2

(12) United States Patent
Yuh et al.

(10) Patent No.: US 12,386,374 B2
(45) Date of Patent: Aug. 12, 2025

(54) PUSH-PULL LOW-DROPOUT (LDO) VOLTAGE REGULATOR

(71) Applicant: Taiwan Semiconductor Manufacturing Company, Ltd., Hsinchu (TW)

(72) Inventors: Perng-Fei Yuh, Hsinchu (TW); Yen-Hsiang Huang, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 162 days.

(21) Appl. No.: 18/325,632

(22) Filed: May 30, 2023

(65) Prior Publication Data

US 2024/0402744 A1 Dec. 5, 2024

(51) Int. Cl.

*G05F 1/575* (2006.01)
*G05F 1/46* (2006.01)
*G05F 1/595* (2006.01)

(52) U.S. Cl.

CPC .............. *G05F 1/595* (2013.01); *G05F 1/468* (2013.01); *G05F 1/575* (2013.01)

(58) Field of Classification Search

CPC ... G05F 1/10; G05F 1/267; G05F 1/46; G05F 1/561; G05F 1/567; G05F 1/569; G05F 1/571; G05F 1/573; G05F 1/5735; G05F 1/461; G05F 1/462; G05F 1/463; G05F 1/465; G05F 1/466; G05F 1/467; G05F 1/56; G05F 1/562; G05F 1/563; G05F 1/565; G05F 1/575; G05F 1/577; G05F 1/585; G05F 1/59; G05F 1/595; G05F 1/607; G05F 1/61; G05F 1/613; G05F 1/614; G05F 1/618; G05F 1/62; G05F 1/66; G05F 1/08; G05F 1/153; G05F 1/16; G05F 1/26; G05F 1/34; G05F 3/02; G05F 3/30; G05F 3/22; G05F 3/222; G05F 3/242; G05F 3/225; G05F 3/245; G05F 3/20;

(Continued)

(56) References Cited

U.S. PATENT DOCUMENTS

| | | | |
|---|---|---|---|
| 9,261,892 | B2 | 2/2016 | Wang et al. |
| 11,073,853 | B2 | 7/2021 | Chen et al. |

(Continued)

FOREIGN PATENT DOCUMENTS

| | | | |
|---|---|---|---|
| TW | 201033779 | A | 9/2010 |
| TW | 201437784 | A | 10/2014 |
| TW | 201840089 | A | 11/2018 |

*Primary Examiner* — Bryan R Perez
(74) *Attorney, Agent, or Firm* — Merchant & Gould P.C.

(57) ABSTRACT

A push-pull Low Dropout (LDO) voltage regulator is provided. An instantaneous output voltage of the push-pull LDO voltage regulator is compared with a first reference voltage and a first output based on comparing the first reference voltage with the instantaneous output voltage is provided. The instantaneous output voltage of the push-pull LDO voltage regulator is compared with a second reference voltage and a second output based on comparing the instantaneous output voltage with the second reference voltage is provided. One or more bi-directional drivers of a plurality of bi-directional drivers of the push-pull LDO voltage regulator are driven based on the first output and the second output. The plurality of bi-directional drives provide the predetermined output voltage.

20 Claims, 7 Drawing Sheets

(58) Field of Classification Search
CPC ..... G05F 3/00; G05F 3/08; G05F 3/10; G05F 3/16; G05F 3/18; G05F 3/185; G05F 3/227; G05F 3/247; G05F 3/26; G05F 3/265; G05F 3/24; G05F 3/262
See application file for complete search history.

(56) References Cited

U.S. PATENT DOCUMENTS

2005/0242791 A1* 11/2005 Rajapandian ............. G05F 1/46
323/268
2023/0130268 A1 4/2023 Ruta et al.

* cited by examiner

PUSH-PULL LOW-DROPOUT (LDO) VOLTAGE REGULATOR

BACKGROUND

Reference voltage generators, such as low-dropout (LDO) regulators, often are used in semiconductor devices. For instance, an LDO regulator is typically used to provide a well-specified and stable direct-current (DC) voltage. Generally, a LDO regulator is characterized by its low dropout voltage, which refers to a small difference between respective input voltage and output voltage. A typical application for an LDO regulator is a memory device, such as a resistive random access memory (RRAM).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

DETAILED DESCRIPTION

Figure 1:
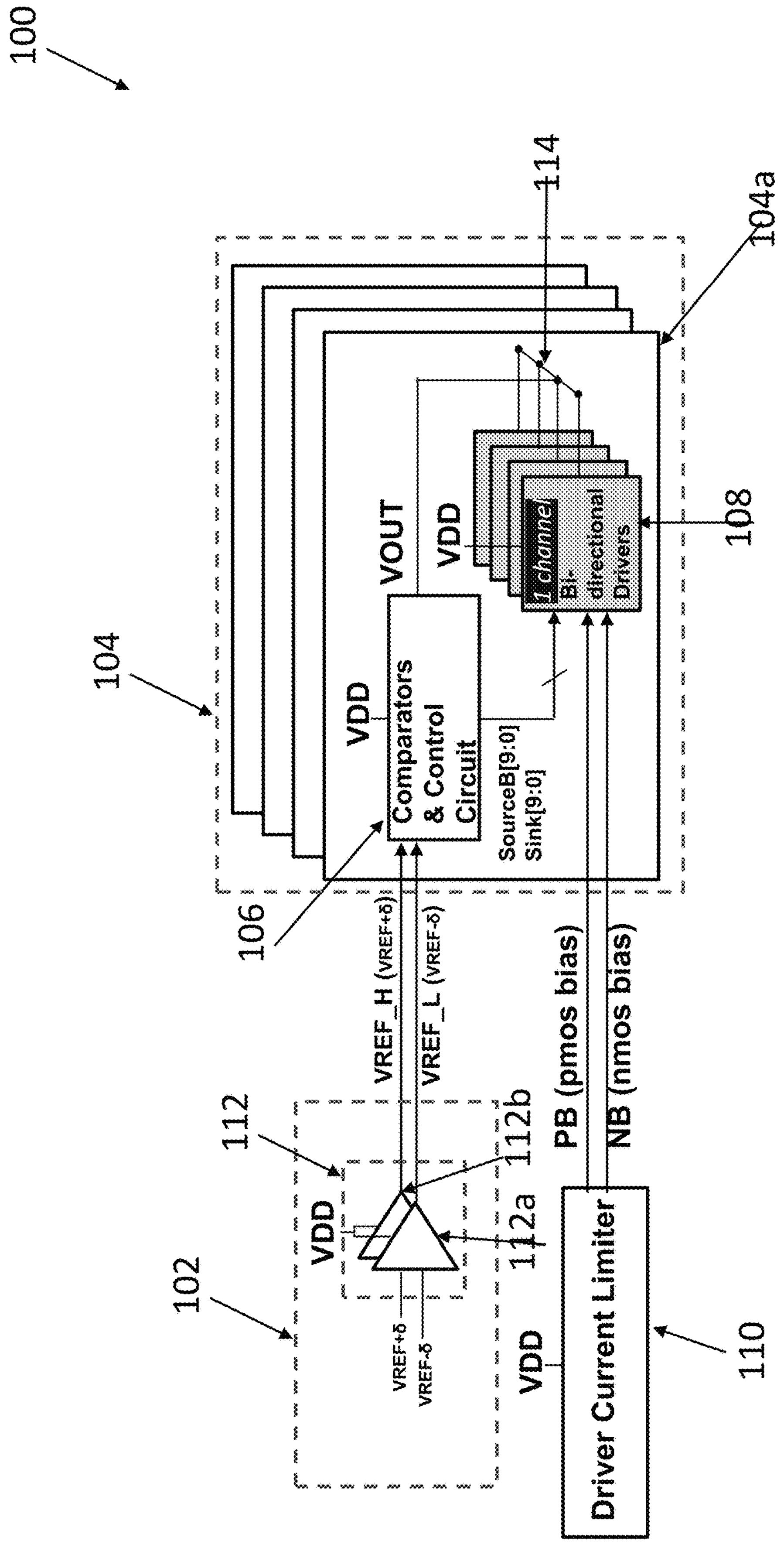
FIG. 1 is a diagram generally illustrating an example LDO voltage regulator circuit in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

A low-dropout (LDO) voltage regulator disclosed herein provides a specified and stable output voltage (e.g., a regulated output voltage) with a low dropout voltage. The dropout voltage used herein refers to a minimum voltage across the LDO voltage regulator to maintain the output voltage being regulated. Even though the input voltage, provided by a power source, falls to a level very near that of the output voltage and is unregulated, the LDO voltage regulator can still produce the output voltage that is regulated and stable. Such a stable characteristic enables the LDO voltage regulator to be used in a variety of integrated circuit (IC) applications, for example, a memory device, a power IC device, etc. In addition, the LDO voltage regulator disclosed herein provides a bi-directional operation for a current to source out or sink in. Moreover, the LDO voltage regulator disclosed herein provides a configurable step size for regulating the output voltage.

FIG. 1 is a diagram of a LDO voltage regulator circuit 100 in accordance with various embodiments of the disclosure. LDO voltage regulator circuit 100 provides an output voltage (VOUT) as an output that is in a specified range and stable. The output voltage (VOUT) can be the same as a supply voltage (VDD) (e.g., 0.8±0.004 volts) or a fraction of the supply voltage (e.g., ½ VDD or 0.4±0.002 volts).

As shown in FIG. 1, LDO voltage regulator circuit 100 includes a reference voltage generator 102. Reference voltage generator 102 provides a first reference voltage (VREF_H) and a second reference voltage (VREF_L). Reference voltage generator 102 is common for or is shared by a plurality of voltage blocks 104. Each of plurality of voltage blocks 104 provides the output voltage (VOUT) of LDO voltage regulator circuit 100.

Each of plurality of voltage blocks 104 (for example, a first voltage block 104*a*) includes a comparators and control circuit 106 and a plurality of bi-directional drivers 108. As discussed in greater detail later in this description, comparators and control circuit 106 controls plurality of bi-directional drivers 108 to provide the output voltage (VOUT) within a hysteresis window (i.e., the specified range) at output node 114.

Comparators and control circuit 106 and plurality of bi-directional drivers 108 are connected in a feedback mode (e.g., a negative feedback mode). That is, an output terminal of comparators and control circuit 106 is connected to an input terminal of plurality of bi-directional drivers 108 and an output terminal of plurality of bi-directional drivers 108 is connected to an input terminal of comparators and control circuit 106.

LDO voltage regulator circuit 100 further includes a driver current limiter 110. Driver current limiter 110 provides a p-channel Metal Oxide Semiconductor (PMOS) bias voltage at a first output terminal and provides a n-channel Metal Oxide Semiconductor (NMOS) bias voltage a second output terminal. Each of the first output terminal and the second output terminal of driver current limiter 110 is connected to each of plurality of bi-directional drivers 108. In examples, driver current limiter 110 can include two voltage sources, each providing the PMOS bias voltage and the NMOS bias voltage respectively. In some examples, each of the PMOS bias voltage and the NMOS bias voltage can be temperature compensated to adjust to a current operating temperature.

Reference voltage generator 102 includes a plurality of buffers 112, for example, a first buffer 112*a* and a second buffer 112*b*. Reference voltage generator 102 can include more than two buffers (discussed in greater detail with reference to FIG. 5). First buffer 112*a* provides the first reference voltage (VREF_H, also referred to as VREF+δ) and second buffer 112*b* provides a second reference voltage (VREF_L, also referred to as VREF−δ) to comparators and control circuit 106. In examples, the VREF is a specified output voltage of LDO voltage regulator circuit 100. A value of δ, also referred to a first value, is defined by a user and represents deviation from the specified output voltage (VOUT). For example, when the VREF is equal to 0.4 volts, then the δ can be 0.02 volts. However, other values of δ are within the scope of the disclosure. The first reference voltage (VREF_H) and the second reference voltage (VREF_L) form an upper limit and a lower limit of the specified range for the output voltage (VOUT) respectively and are provided to each of plurality of voltage blocks 104.

Figure 2:
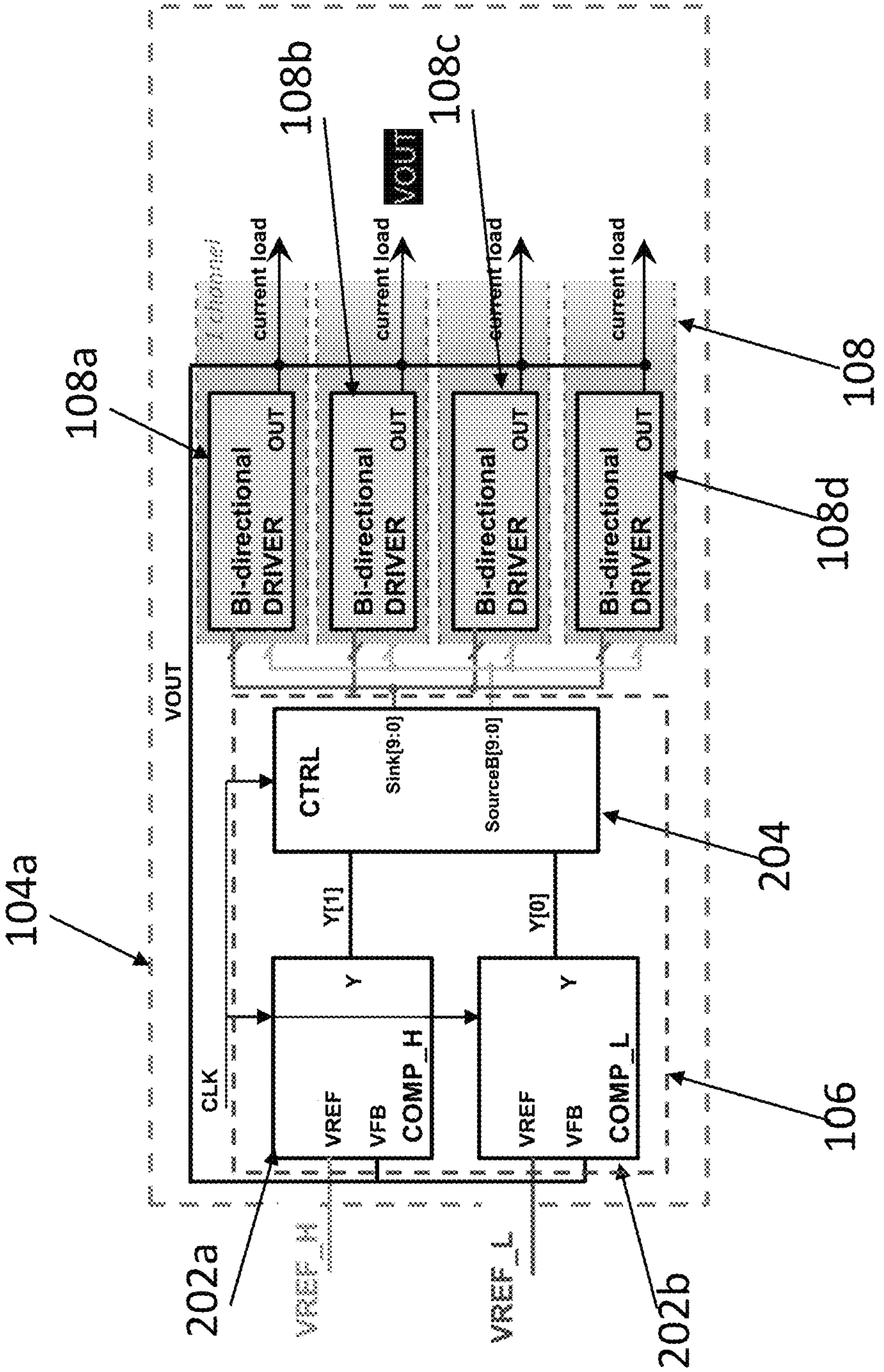
FIG. 2 is a diagram generally illustrating a voltage block of the LDO voltage regulator circuit in accordance with some embodiments.

FIG. 2 is a diagram of first voltage block 104*a* of plurality of voltage blocks 104 of LDO voltage regulator circuit 100. Each of plurality of voltage blocks 104 provides the output voltage (VOUT) of LDO voltage regulator circuit 100. Other voltage blocks of plurality of voltage blocks 104 are similar to first voltage block 104*a* and, therefore, are not described in greater details for brevity. As shown in FIG. 2, first voltage block 104*a* includes comparators and control circuit 106 and plurality of bi-directional drivers 108. Comparators and control circuit 106 includes a first comparator 202*a* and a second comparator 202*b*. Comparators and control circuit 106 can include more than two comparators (discussed in greater detail with reference to FIG. 5). Comparators and control circuit 106 further includes a control circuit 204. Plurality of bi-directional drivers 108 includes a first bi-directional driver 108*a*, a second bi-directional driver 108*b*, a third bi-directional 108*c*, and a fourth bi-directional driver 108*d*. Plurality of bi-directional drivers 108 can include more than four bi-directional drivers.

A first input terminal of first comparator 202*a* is connected to an output terminal of first buffer 112*a* and receives the first reference voltage (VREF_H) from first buffer 112*a*. A second input terminal of first comparator 202*a* is connected to an output terminal of plurality of bi-directional drivers 108 and receives a feedback voltage (VFB). The feedback voltage (VFB) is an instantaneous output voltage (VOUT) at output node 114 of plurality of bi-directional drivers 108. First comparator 202*a* compares the first reference voltage (VREF_H) with the feedback voltage (VFB) and provides a first output Y[1] at an output terminal. The first output Y[1] is a value 1 when the feedback voltage (VFB) is higher or greater than the first reference voltage (VREF_H). The first output Y[1] is a value 0 when the feedback voltage (VFB) is less or lower than the first reference voltage (VREF_H).

A first input terminal of second comparator 202*b* is connected to an output terminal of second buffer 112*b* and receives the second reference voltage (VREF_L) from second buffer 112*b*. A second input terminal of second comparator 202*b* is connected to the output terminal of plurality of bi-directional drivers 108 and receives the feedback voltage (VFB). Second comparator 202*b* compares the second reference voltage (VREF_L) with the feedback voltage (VFB) and provides a second output Y[0] at an output terminal. The second output Y[0] is a value 1 when the feedback voltage (VFB) is lower or less than the second reference voltage (VREF_L). The second output Y[0] is a value 1 when the feedback voltage (VFB) is greater or higher than the second reference voltage (VREF_L).

A first input terminal of control circuit 204 is connected to the output terminal of first comparator 202*a* and receives the first output Y[1] from first comparator 202*a*. A second input terminal of control circuit 204 is connected to the output terminal of second comparator 202*b* and receives the second output Y[0] from second comparator 202*b*. Control circuit 204 generates either a sink signal (i.e., Sink [9:0]) or a source signal (i.e., Source [9:0]) based on the first output Y[1] and second output Y[0] at a output terminal (discussed in greater detail with respect to FIG. 4 of the specification).

An input terminal of each of plurality of bi-directional drivers 108 is connected to the output terminal of control circuit 204 and receives either the sink signal (i.e., Sink [9:0]) or the source signal (i.e., Source [9:0]) from control circuit 204. Plurality of bi-directional drivers 108 provide the output voltage (VOUT) at output node 114. Plurality of bi-directional drivers 108 alter (i.e., pull up or pull down (hence, bi-directional) the output voltage (VOUT) based on the sink signal (i.e., Sink [9:0]) or the source signal (i.e., Source [9:0]) received from control circuit 204 so that the output voltage VOUT is within the specified range.

Figure 3:
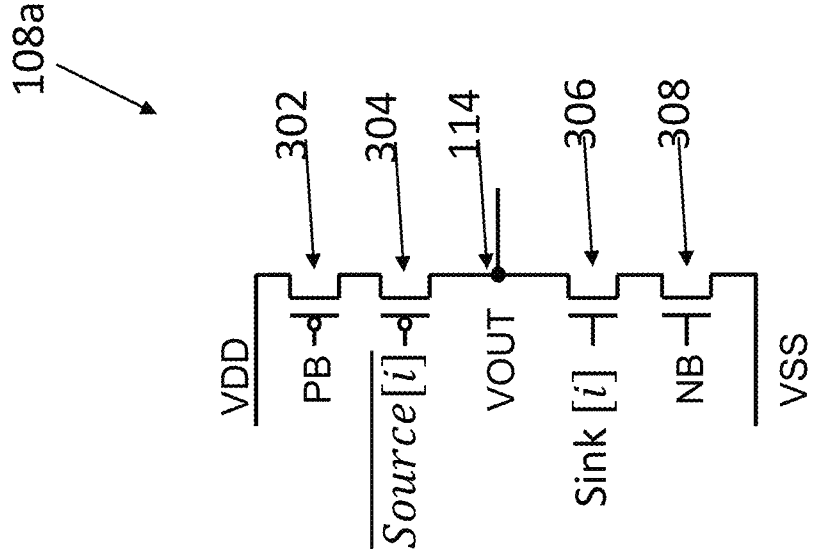
FIG. 3 is a diagram generally illustrating an example bi-directional driver of the LDO voltage regulator circuit in accordance with some embodiments.

FIG. 3 is a diagram illustrating a first bi-directional driver 108*a* of plurality of bi-directional drivers 108 of LDO voltage regulator circuit 100. First bi-directional drivers 108*a* provides the output voltage (VOUT) that is within the specified range at output node 114. Other bi-directional drivers of plurality of bi-directional drivers 108 are similar to first bi-directional driver 108*a* and are not being described for brevity. As shown in FIG. 3, first bi-directional driver 108*a* includes a first transistor 302, a second transistor 304, a third transistor 306, a fourth transistor 308, and output node 114. A source of first transistor 302 is connected to the supply voltage (i.e., VDD) and a drain of first transistor 302 is connected to a source of second transistor 304. A drain of second transistor 304 is connected to output node 114. A gate of first transistor 302 is connected to driver current limiter 110 and receives the PMOS bias voltage from driver current limiter 110. A gate of second transistor 304 is connected to the output terminal of control circuit 204 and receives inverted source signal (i.e., $\overline{\text{Source}[9:0]}$).

Each of first transistor 302 and second transistor 304 is a PMOS transistor but other types of transistors may be used. In addition, each of first transistor 302 and second transistor 304 is symmetrical. That is, a source of each first transistor 302 and second transistor 304 can be a drain and a drain can be a source.

A source of third transistor 306 is connected to output node 114 and a drain of third transistor 306 is connected to a source of fourth transistor 308. A drain of fourth transistor 308 is connected to a ground node (i.e., VSS). A gate of third transistor 306 is connected to the output terminal of control circuit 204 and receives the sink signal (i.e., Sink [9:0]). A gate of fourth transistor 308 is connected to driver current limiter 110 and receives NMOS bias voltage from driver current limiter 110.

Each of third transistor 306 and fourth transistor 308 is a NMOS transistor but other types of transistors may be used. In addition, each of third transistor 306 and fourth transistor 308 is symmetrical. That is, a source of each third transistor 306 and fourth transistor 308 can be a drain and a drain can be a source.

During operation, at a rising edge of the clock signal (i.e., CLK), each of first comparator 202*a* and second comparator 202*b* compare the first reference signal (VREF_H) and the second reference signal (VREF_L) with the feedback voltage (VFB) (i.e., the instantaneous output voltage (VOUT) respectively. Based on the comparison, first comparator 202*a* provides the first output (Y[1]) and second comparator 202*b* provides the second output Y[0] to control circuit 204. As explained in the following sections of the disclosure, control circuit 204 generates either a sink signal (i.e., Sink

[9:0]) or a source signal (i.e., Source [9:0]) based the first output Y[1] and second output Y[0] at a output terminal.

Figure 4:
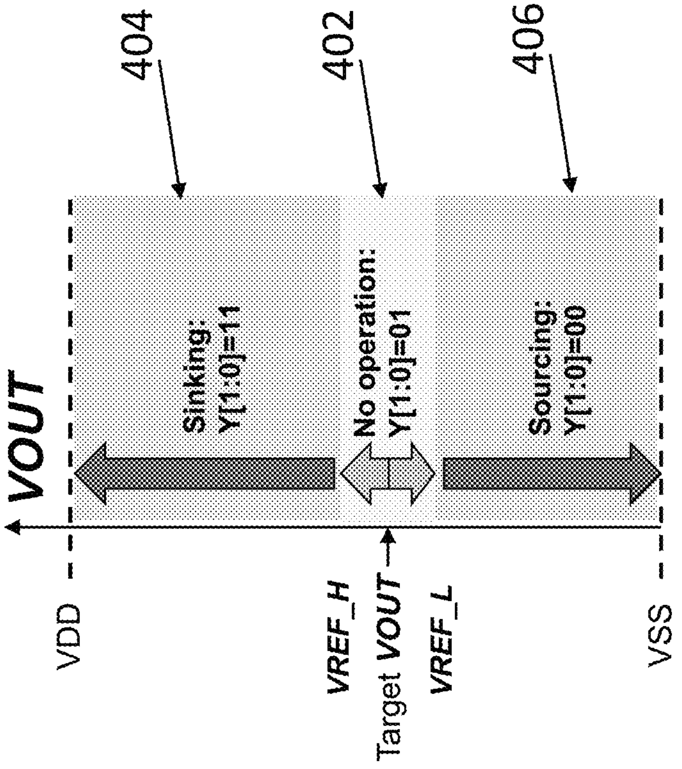
FIG. 4 is a diagram generally illustrating states of operation of the LDO voltage regulator circuit in accordance with some embodiments.

FIG. 4 illustrates operation states of first comparator 202*a*, second comparator 202*b*, and control circuit 204 in accordance with example embodiments of the disclosure. As shown in FIG. 4, in a first state 402, the feedback voltage (VFB) is higher than the second reference voltage (VREF_L) but lower than the first reference voltage (VREF_H). Since, the feedback voltage (VFB) is lower than the first reference voltage (VREF_L), the first output (Y[1]) of first comparator 202*a* is logic 0. In addition, since, the feedback voltage (VFB) is greater than the second reference voltage (VREF_L), the second output (Y[0]) of second comparator 202*b* is logic 1. Therefore, a combined output (Y[1:0]) of first comparator 202*a* and second comparator 202*b* is logic 01. The combined output of logic 01 indicates to control circuit 204 that the instantaneous output voltage (VOUT) of the LDO voltage regulator circuit 100 is within the specified range and therefore no action is needed. Therefore, in first state 402, control circuit 204 does not generate any signals for plurality of bi-directional drivers 108. First state 402, hence, is also referred to as a no-operation (NOP) state. In some examples, control circuit 204 may reset plurality of bi-directional drivers 108 in the NOP state. Control circuit 204 may use one of the following logic operations:

UP=NOR(Y[1],Y[0]) (=1 to increase sourcing drivers)

DOWN=AND(Y[1],Y[0]) (=1 to increase sinking drivers)

NOP=NOR(UP, DOWN); or

NOP=AND(INV(Y[1]),Y[0]).

In examples, control circuit 204 may include a NOR logic circuit and an AND logic circuit to perform these logic operations. The NOR logic circuit may determine a logical NOR of the first output (Y[1]) of first comparator 202*a* and second output (Y[0]) of second comparator 202*b*. If the output of the logical NOR of the first output (Y[1]) of first comparator 202*a* and second output (Y[0]) of second comparator 202*b* is a logic 1, then control circuit 204 may generate a source signal (i.e., Source [9:0]) to increase sourcing drivers (also referred to as a pull up operation (UP). Similarly, the AND logic circuit may determine a logical AND of the first output (Y[1]) of first comparator 202*a* and second output (Y[0]) of second comparator 202*b*. If the output of the logical AND of the first output (Y[1]) of first comparator 202*a* and second output (Y[0]) of second comparator 202*b* is a logic 1, then control circuit 204 may generate a sink signal (i.e., Sink [9:0]) to increase sinking drivers (also referred to as a pull down operation (DOWN). In the no-operation (NOP) state, the NOR logic circuit may determine a logical NOR of the UP and the DOWN. In alternate embodiment, in the no-operation (NOP) state, the AND logic circuit may determine a logical AND of an inverse of the first output (Y[1]) of first comparator 202*a* and second output (Y[0]) of second comparator 202*b*.

In a second state 404, the feedback voltage (VFB) (i.e., the instantaneous output voltage (VOUT)) is higher than both the first reference voltage (VREF_H) and the second reference voltage (VREF_L). Since, the feedback voltage (VFB) is higher than the first reference voltage (VREF_L), the first output (Y[1]) of first comparator 202*a* is logic 1. In addition, since the feedback voltage (VFB) is greater than the second reference voltage (VREF_L), the second output Y[0] of second comparator 202*b* is also logic 1. Therefore, a logical AND of a combined output (Y[1:0]) of first comparator 202*a* and second comparator 202*b* is a logic 1. The value of the logical AND of the combined output (Y[1:0]) as the logic 1 indicates to control circuit 204 that the instantaneous output voltage (VOUT) of the LDO voltage regulator circuit 100 is higher than the specified range. Since, the instantaneous output voltage (VOUT) of LDO voltage regulator circuit 100 is higher than the specified range, control circuit 204, in second state 404, generates a sink signal (i.e., Sink [9:0]) to increase a number of sinking drivers to lower the instantaneous output voltage (VOUT). The number [9:0] is just an example, it can vary based on circuit optimization. For example, number [9:0] may vary when a different number of plurality of bi-directional drivers 108 are used.

The sink signal (i.e., Sink [9:0]) is provided to plurality of bi-directional drivers 108. The sink signal (i.e., Sink [9:0]) switches ON third transistor 306 of one or more bi-directional drivers of plurality of bi-directional drivers 108. This results in pulling down of the instantaneous output voltage (VOUT) as sinking current flows from output node 114 to the ground node (VSS) through fourth transistor 308 pulling down of the instantaneous output voltage (VOUT).

The instantaneous output voltage (VOUT) may again be compared with the first reference voltage (VREF_H) and the second reference voltage (VREF_L) at a next rising edge of the clock signal (CLK). If the instantaneous output voltage (VOUT) in the subsequent comparison is still greater than both the first reference voltage (VREF_H) and the second reference voltage (VREF_L), control circuit 204 may again generate the sink signal (i.e., Sink [9:0]) to further pull down the instantaneous output voltage (VOUT). A number of the one or more bi-directional drivers of plurality of bi-directional drivers 108 switched ON in the subsequent comparisons may increase from the previous comparison if the instantaneous output voltage (VOUT) is still greater than both the first reference voltage (VREF_H) and the second reference voltage (VREF_L). For example, if one bi-directional driver was switched ON in the first comparison, then more than one bi-directional driver (e.g., two or three) may be switched ON in a second comparison if the instantaneous output voltage (VOUT) is still greater than both the first reference voltage (VREF_H) and the second reference voltage (VREF_L) in the second comparison.

Increasing the number of bi-directional drivers switched ON in subsequent comparisons may increase or accelerate a rate of pulling down of the instantaneous output voltage (VOUT) in the specified range. The number of the one or more bi-directional drivers of plurality of bi-directional drivers 108 switched ON in each comparison is also referred to as a step size. The step size can be predefined for each comparison conditioned upon outcomes from one or more previous comparisons. In some examples, the step size (i.e., the number of one or more bi-directional drivers of plurality of bi-directional driver 108 switched ON) can dynamically be modified or determined.

However, if the instantaneous output voltage (VOUT) in the subsequent comparison falls between the first reference voltage (VREF_H) and the second reference voltage (VREF_L), control circuit 204 may not generate any sink signal (i.e., Sink [9:0]) and may reset plurality of bi-directional drivers 108. Control circuit 204 may use one of the following logic operations in second state 404:

DOWN=AND(Y[1],Y[0]) (=1 to increase sinking drivers)

Sink[0]=DOWN

Sink[i]=Sink[i−1]*DOWN for i=1, . . . , 9.

Thus, control circuit 204 may keep increasing a number of bi-directional drivers switched ON from plurality of bi-directional drivers 108 until the instantaneous output voltage (VOUT) is pulled down to between the first reference voltage (VREF_H) and the second reference voltage (VREF_L).

In a third state 406, the feedback voltage (VFB) (i.e., the instantaneous output voltage (VOUT)) is lower than both the first reference voltage (VREF_H) and the second reference voltage (VREF_L). Since, the feedback voltage (VFB) is lower than the first reference voltage (VREF_L), the first output (Y[1]) of first comparator 202*a* is logic 0. In addition, since the feedback voltage (VFB) is lower than the second reference voltage (VREF_L), the second output Y[0] of second comparator 202*b* is also logic 0. Therefore, the logical NOR of a combined output (Y[1:0]) of first comparator 202*a* and second comparator 202*b* is a logic 0. The value of the logical NOR of the combined output (Y[1:0]) as the logic 0 indicates to control circuit 204 that the instantaneous output voltage (VOUT) of the LDO voltage regulator circuit 100 is lower than the specified range. Since, the instantaneous output voltage (VOUT) of the LDO voltage regulator circuit 100 is lower than the hysteresis window, control circuit 204, in third state 406, generates a source signal (i.e., Source [9:0]) to pull up the instantaneous output voltage (VOUT).

An inverted source signal (i.e., $\overline{\text{Source[9:0]}}$) is provided to plurality of bi-directional drivers 108. The inverted source signal (i.e., $\overline{\text{Source[9:0]}}$) switches ON second transistor 304 of each of one or more bi-directional drivers of plurality of bi-directional drivers 108. This results in pulling up of the instantaneous output voltage (VOUT) as a sourcing current flows from the supply voltage (i.e., VDD) through first transistor 302 to output node 114. In some examples, instead of inverted source signal (i.e., $\overline{\text{Source[9:0]}}$), just the source signal (i.e., Source [9:0]) may be provided to plurality of bi-directional drivers 108.

The instantaneous output voltage (VOUT) may again be compared with the first reference voltage (VREF_H) and the second reference voltage (VREF_L) at a next rising edge of the clock signal (CLK). If the instantaneous output voltage (VOUT) in the subsequent comparison is still lower than both the first reference voltage (VREF_H) and the second reference voltage (VREF_L), control circuit 204 may again generate the source signal (i.e., Source [9:0]) to further pull up the instantaneous output voltage (VOUT). A number of the one or more bi-directional drivers of plurality of bi-directional drivers 108 switched ON in the subsequent comparisons in third state 406 may increased from a previous comparison if the instantaneous output voltage (VOUT) is still lower than both the first reference voltage (VREF_H) and the second reference voltage (VREF_L) in the subsequent comparison. For example, if one bi-directional driver was switched ON in the first comparison, then more than one bi-directional driver (e.g., two or three) may be switched ON in a second comparison if the instantaneous output voltage (VOUT) is still lower than both the first reference voltage (VREF_H) and the second reference voltage (VREF_L) in the second comparison. Increasing the number of bi-directional drivers switched ON in subsequent comparisons may increase or accelerate a rate of pulling up of the instantaneous output voltage (VOUT) in the specified range. However, if the instantaneous output voltage (VOUT) is between the first reference voltage (VREF_H) and the second reference voltage (VREF_L) in the subsequent comparison, control circuit 204 may not generate any source signal (i.e., Source [9:0]) and may reset plurality of bi-directional drivers 108. Control circuit 204 may use one of the following logic operations to in third state 406:

UP=NOR(Y[1],Y[0]) (=1 to increase sourcing drivers)
Source[0]=UP
Source[i]=Source[i−1]*UP for i=1, . . . , 9
SourceB(i)=INV(Source[i].

Thus, control circuit 204 may keep increasing a number of bi-directional drivers switched ON from plurality of bi-directional drivers 108 until the instantaneous output voltage (VOUT) is pulled up to between the first reference voltage (VREF_H) and the second reference voltage (VREF_L).

Thus, LDO voltage regulator circuit 100 provides both the sourcing current and the sinking current at the output terminal in addition to the output voltage (VOUT). In addition, an amount of both the sourcing current and the sinking current can vary based on a loading for an optimal dynamic response. For example, the instantaneous output voltage (VOUT) may vary (i.e., increase or decrease with variation in the loading at output node 114). LDO voltage regulator circuit may thus vary the sourcing current and the sinking current to maintain the instantaneous output voltage (VOUT) in the specified range. In addition, both the sourcing current and the sinking current are limited by the NMOS bias voltage and the PMOS bias voltage provided by driver current limiter 110 to provide a better Process, Voltage, and Temperature (PVT) control. For example, since the sourcing current flows through first transistor 302 which is biased using the PMOS bias voltage provided by driver current limiter 110, the sourcing current can be limited by controlling the PMOS bias voltage. Similarly, since the sinking current flows through fourth transistor 308 which is biased using the NMOS bias voltage provided by driver current limiter 110, the sinking current can be limited by controlling the PMOS bias voltage. The NMOS bias voltage and the PMOS bias voltage provided by driver current limiter 110 may both be compensated for any variations n the PVT.

Figure 5:
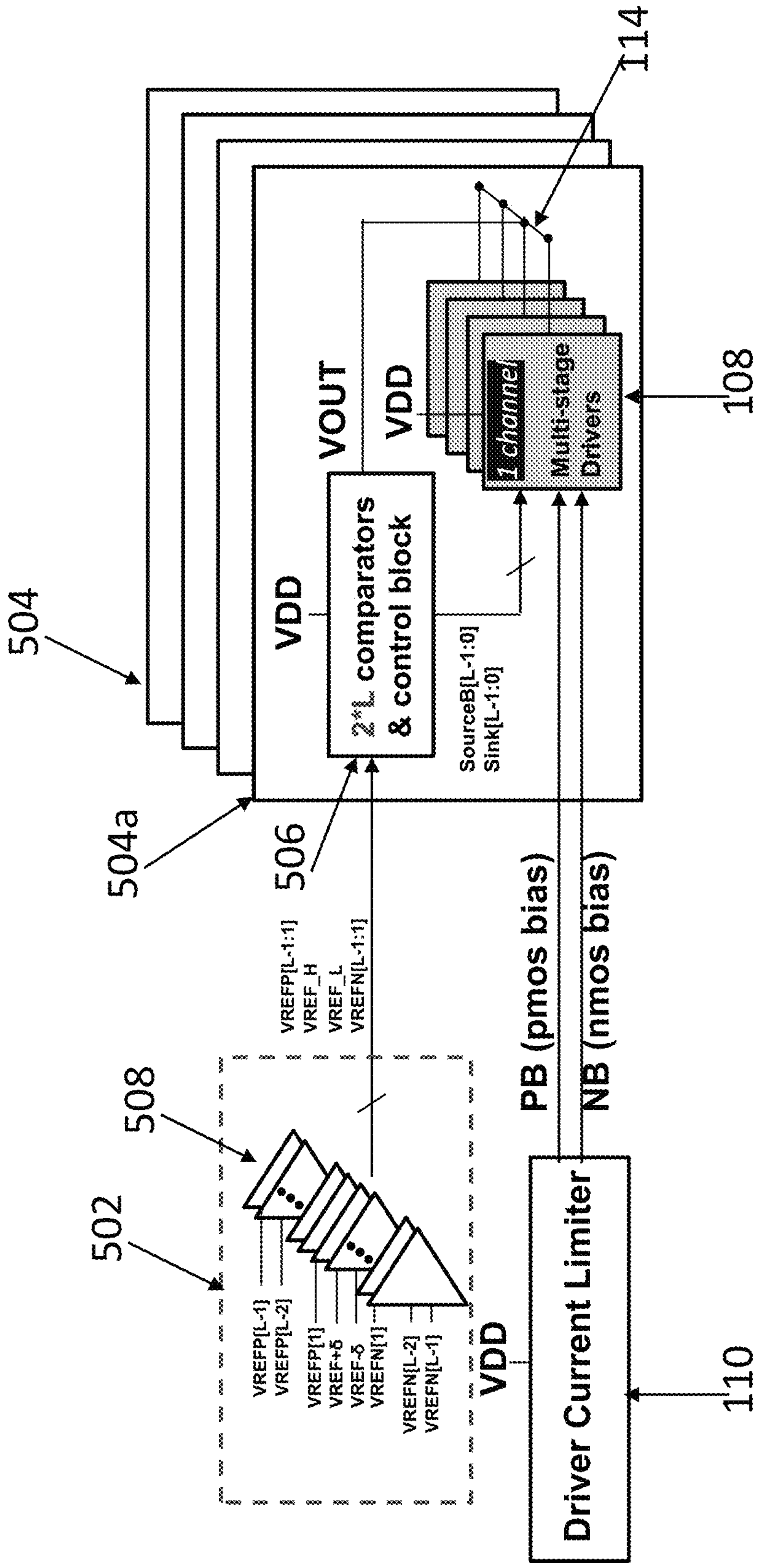
FIG. 5 a diagram generally illustrating an example multi-level LDO voltage regulator circuit in accordance with some embodiments.

FIG. 5 is a diagram illustrating an example multi-level LDO voltage regulator circuit 500 in accordance with some embodiments. Like LDO voltage regulator circuit 100 of FIG. 1, multi-level LDO voltage regulator circuit 500 of FIG. 5 provides a specified and stable output voltage (VOUT) as an output. However, multi-level LDO voltage regulator circuit 500 employs multi-level comparators. For example and discussed in greater detail in the following parts of the disclosure, the specified range for the output voltage (VOUT) is divided into a plurality of successive windows or sub-ranges, each having sub-range boundaries (i.e., an upper and a lower voltage levels). Each of the successive windows or sub-ranges are associated with a pair of comparators to compare the instantaneous output voltage with respective sub-range boundaries.

As shown in FIG. 5, multi-level LDO voltage regulator circuit 500 includes a multi-level reference voltage generator 502. Like, reference voltage generator 102 of FIG. 1, multi-level reference voltage generator 502 is common for or is shared by a plurality of multi-level voltage blocks 504. However, and as discussed in a greater detail in the following sections of the disclosure, multi-level reference voltage generator 52 generates a plurality of sub-range boundaries (i.e., an upper and a lower voltage levels) for a plurality of successive windows of the specified range. Each of plurality of multi-level voltage blocks 504 (for example, a first multi-level voltage block 504*a*) includes a multi-level comparators and control circuit 506 and plurality of bi-directional drivers 108. Multi-level comparators and control circuit 506 and plurality of bi-directional drivers 108 are connected in a feedback loop. That is, an output terminal of multi-level comparators and control circuit 506 is connected to an input terminal of plurality of bi-directional drivers 108 and an output terminal of plurality of bi-directional drivers 108 is connected to an input terminal of multi-level comparators and control circuit 506.

Multi-level reference voltage generator 502 includes a plurality of buffers 508 (i.e., L buffer pairs). The hysterics window or the specified range for the output voltage (VOUT) is divided into a plurality of successive windows or sub-ranges (i.e., L windows or sub-ranges). Each buffer pair of the L buffer pairs provide the first reference voltage (VREF_H) and the second reference voltage (VREF_L) for a respective sub-range at respective first output terminal and a second output terminal respectively. The first reference voltage (VREF_H) and the second reference voltage (VREF_L) of a sub-range of the plurality of sub-ranges define an upper boundary and a lower boundary for that sub-range. The first reference voltage (VREF_H) and the second reference voltage (VREF_L) of each of the plurality of sub-ranges are provided to each of plurality of multi-level voltage blocks 504. As discussed in the following sections of the disclosure, multi-level voltage blocks 504 uses the first reference voltage (VREF_H) and the second reference voltage (VREF_L) of each of the plurality of sub-ranges are provided to generate the sink signal or the source signals.

Figure 6:
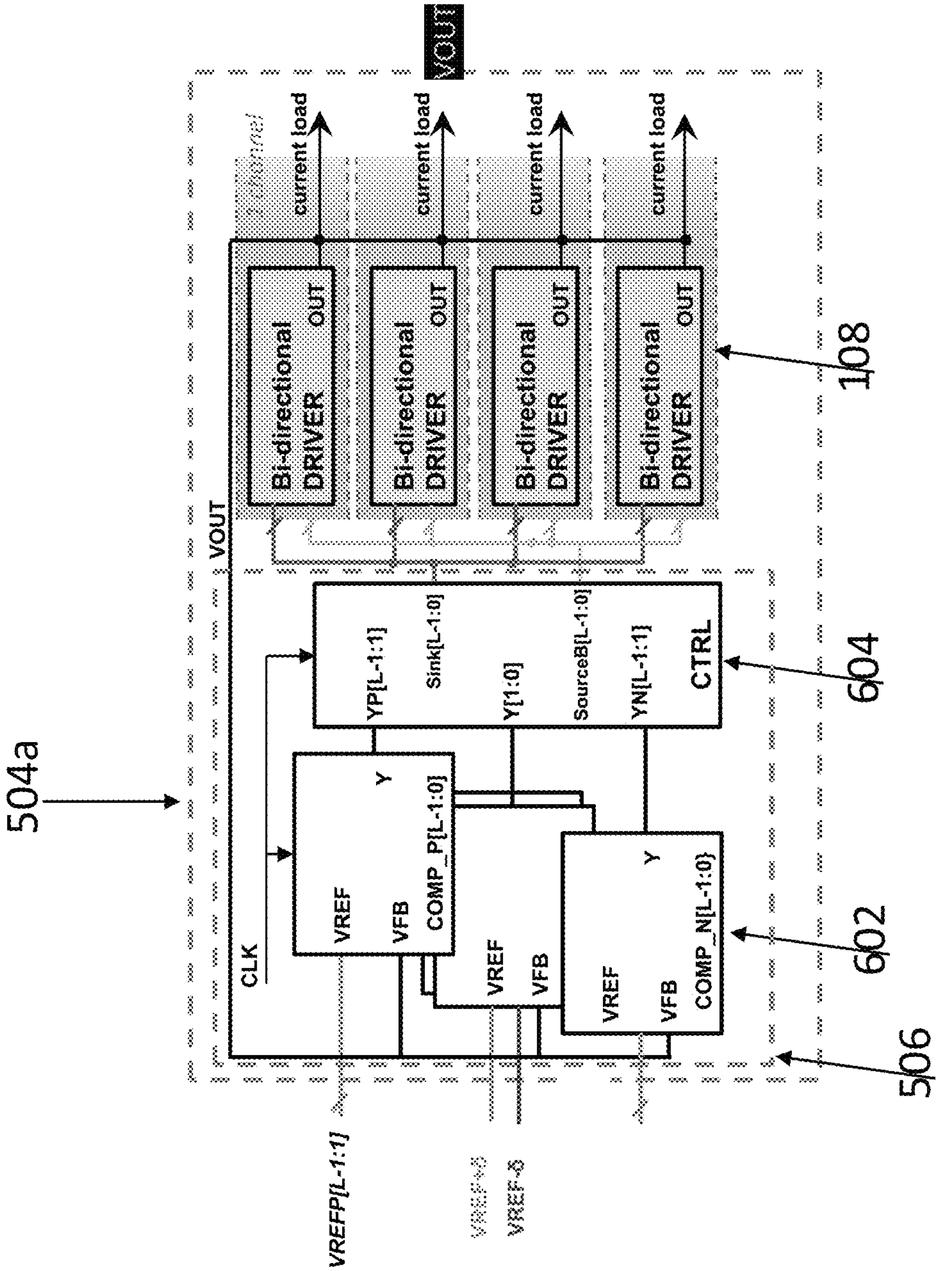
FIG. 6 is a diagram generally illustrating a multi-level voltage block of the multi-level LDO voltage regulator circuit in accordance with some embodiments.

FIG. 6 is a diagram of first multi-level voltage block 504*a* of plurality of multi-level voltage blocks 504 of multi-level LDO voltage regulator circuit 500. Like first voltage block 104 a of LDO voltage regulator circuit 100 of FIG. 1, first multi-level voltage block 504*a* of multi-level LDO voltage regulator circuit 500 of FIG. 5 provides the output voltage (VOUT) that is within the specified range. However, first multi-level voltage block 504*a* of multi-level LDO voltage regulator circuit 500 of FIG. 5 utilizes multiple pairs of comparators as opposed to just one pair of comparators utilized by first voltage block 104 a of LDO voltage regulator circuit 100 of FIG. 1. As shown in FIG. 6, first multi-level voltage block 504*a* includes multi-level comparators and control circuit 506 and plurality of bi-directional drivers 108. Multi-level comparators and control circuit 506 includes a plurality of comparator pairs 602 (e.g., L comparator pairs). Multi-level comparators and control circuit 506 further includes a control circuit 604.

Each comparator pair of plurality of comparator pairs 602 is associated with a buffer pair of plurality of buffer pairs 508. For example, a first input terminal of a first comparator of a comparator pair is connected to an output terminal of a first buffer of an associated buffer pair and receives the first reference voltage (VREF(i)+6 or VREF(i)_H) from the first buffer. A second input terminal of the first comparator is connected to an output terminal of plurality of bi-directional drivers 108 and receives the feedback voltage (VFB) (e.g., the instantaneous output voltage (VOUT)). The first comparator compares the first reference voltage (VREF(i)+δ or VREF(i)_H) with the feedback voltage (VFB) and provides a first output Y(i)[1] at an output terminal.

A first input terminal of a second comparator of the comparator pair is connected to an output terminal of a second buffer of the associated buffer pair and receives the second reference voltage (VREF(i)-δ or VREF(i)_L) from the second buffer. A second input terminal of the second comparator is connected to the output terminal of plurality of bi-directional drivers 108 and receives the feedback voltage (VFB). The second comparator compares the second reference voltage (VREF(i)-δ or VREF_L) with the feedback voltage (VFB) and provides a second output Y[0] at an output terminal.

Input terminals of control circuit 604 are connected to the output terminals of first comparator and second comparator of each of plurality of comparator pairs 602 and receive the first output Y(i)[1] and second output Y(i)[0] from the first comparator and the second comparator of each of plurality of comparator pairs 602. Control circuit 604 generates either a sink signal (i.e., Sink [L−1:0]) or a source signal (i.e., Source [L−1:0]) based on the first outputs Y(i)[1] and the second outputs Y(i)[0] at an output terminal, similar to the example discussed in conjugation with FIG. 1.

An input terminal of each of plurality of bi-directional drivers 108 is connected to the output terminal of control circuit 604 and receives either the sink signal (i.e., Sink [L−1:0]) or the source signal (i.e., Source [L−1:0]) from control circuit 604. Plurality of bi-directional drivers 108 alter the instantaneous output voltage (VOUT) and a current load based on the sink signal (i.e., Sink [L−1:0]) or the source signal (i.e., Source [L−1:0]), similar to the example discussed in conjugation with FIG. 1.

The sink signal (i.e., Sink [L−1:0]) switches ON third transistor 306 of each of one or more bi-directional drivers of plurality of bi-directional drivers 108. This results in pulling down of the instantaneous output voltage (VOUT) as sinking current flows from output node 114 to the ground node (VSS) pulling down of the instantaneous output voltage (VOUT). The source signal (i.e., Source [L−1:0]) switches ON second transistor 304 of one or more bi-directional drivers of plurality of bi-directional drivers 108. This results in pulling up of the instantaneous output voltage (VOUT) as source current flows from the supply node (VDD) to output node 114.

Multi-level LDO voltage regulator circuit 500 of FIG. 5 may provide a faster or better transient response to change in the output voltage (VOUT) compared to LDO voltage regulator circuit 100 of FIG. 1. For example, multi-level LDO voltage regulator circuit 500 of FIG. 5 may provide a better step size control because of multiple comparators. That is, the step size in multi-level LDO voltage regulator circuit 500 can be larger and can reduce a time needed to pull down or pull up the output voltage (VOUT) in the specified range. For example, since the instantaneous output voltage (VOUT) is compared with multiple sub-ranges, a difference between the instantaneous output voltage (VOUT) and the specified range is determined in one step. Based on the difference, a number of bi-directional drivers of plurality of bi-directional drivers 108 may be switched ON in a single step thereby obviating a need for multiple iterations. In addition, the step size in multi-level LDO voltage regulator circuit 500 can be controlled at a finer level thereby further reducing the time needed to pull down or pull up the output voltage (VOUT) in the specified range.

Figure 7:
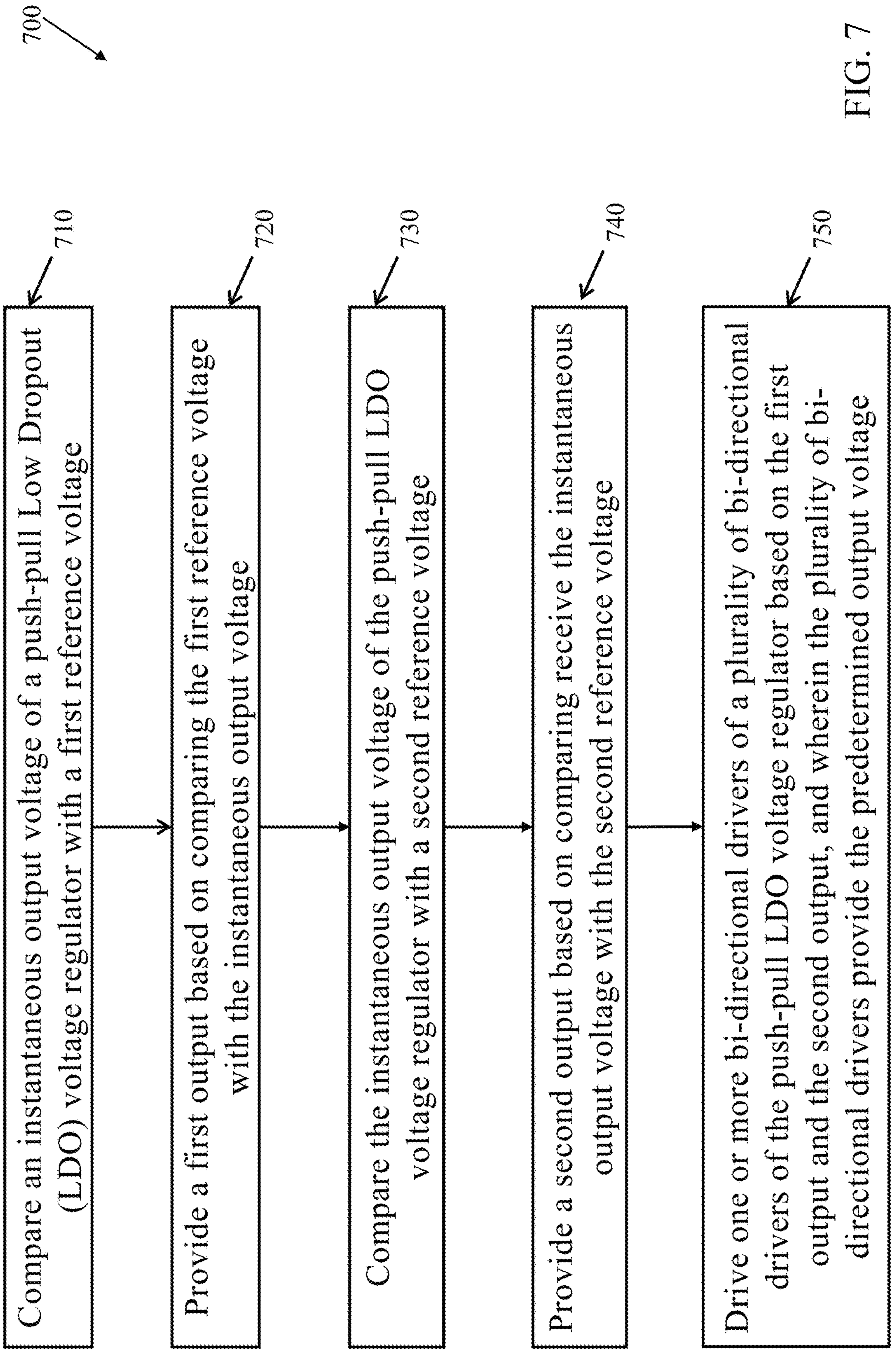
FIG. 7 is a flowchart of a method for generating a regulated output voltage in accordance with some embodiments.

FIG. 7 is a flow diagram illustrating a method 700 for providing a predetermined output voltage in accordance with some embodiments of the disclosure. Method 700 may be implemented in LDO voltage regulator circuit 100, multi-level LDO voltage regulator circuit 500, or a chip comprising LDO voltage regulator circuit 100 or multi-level LDO voltage regulator circuit 500. In addition, steps of method 700 may be stored as instructions which may be executed by a processor to implement method 700.

At block 710 of method 700, the instantaneous output voltage (VOUT) of LDO voltage regulator circuit 100 is compared with the first reference voltage (VREF_H). As discussed above in reference to FIGS. 1-6, first comparator 202*a* receives the first reference voltage (VREF+δ or VREF_H) from first buffer 112*a* at the first input terminal. First comparator 202*a* receives the instantaneous output voltage (VOUT) as the feedback voltage (VFB) from plurality of bi-directional drivers 108 at the second terminal.

First comparator 202*a* then compares the instantaneous output voltage (VOUT) with the first reference voltage (VREF_H).

At block 720 of method 700, the first output (Y[1]) is provided based on comparing the instantaneous output voltage (VOUT) with the first reference voltage (VREF_H). For example, first comparator 202*a* provides the first output (Y[1]) at the output terminal based on comparing the instantaneous output voltage (VOUT) received at the second input terminal with the first reference voltage (VREF_H) received on the first output terminal.

At block 730 of method 700, the instantaneous output voltage (VOUT) of LDO voltage regulator circuit 100 is compared with the second reference voltage (VREF_L). As discussed above in reference to FIGS. 1-6, second comparator 202*b* receives the second reference voltage (VREF−6 or VREF_L) from second buffer 112*b* at the first input terminal. Second comparator 202*b* receives the instantaneous output voltage (VOUT) as the feedback voltage (VFB) from plurality of bi-directional drivers 108 at the second terminal. Second comparator 202*b* then compares the instantaneous output voltage (VOUT) with the second reference voltage (VREF_L).

At block 740 of method 700, the second output (Y[0]) is provided based on comparing the instantaneous output voltage (VOUT) with the second reference voltage (VREF_L). For example, second comparator 202*b* provides the second output (Y[0]) at the output terminal based on comparing the instantaneous output voltage (VOUT) received at the second input terminal with the second reference voltage (VREF_L) received on the first output terminal.

At block 750 of method 700, one or more bi-directional drivers of plurality of bi-directional drivers 108 are driven based on the first output (Y[1]) and the second output (Y[0]), similar to the example discussed in conjugation with FIG. 1. Plurality of bi-directional drivers 108 provide the predetermined output voltage. For example, and as discussed above with reference to FIGS. 1-6, control circuit 204 receives the first output (Y[1]) and the second output (Y[0]) from first comparator 202*a* and second comparator 202*b* respectively, and generates either a sink signal (i.e., Sink [9:0]) or a source signal (i.e., Source [9:0]) based on the first output Y[1] and second output Y[0] at a output terminal. Plurality of bi-directional drivers 108 receives either the sink signal (i.e., Sink [9:0]) or the source signal (i.e., Source [9:0]) from control circuit 204 and alter (i.e., pull up or pull down) the output voltage (VOUT) based on the sink signal (i.e., Sink [9:0]) or the source signal (i.e., Source [9:0]).

In accordance with some embodiments, a push-pull LDO voltage regulator circuit comprises: a first comparator configured to: compare an instantaneous output voltage of the push-pull LDO voltage regulator with a first reference voltage, and provide a first output based on comparing the first reference voltage with the instantaneous output voltage; a second comparator configured to: compare the instantaneous output voltage of the push-pull LDO voltage regulator with a second reference voltage, and provide a second output based on comparing the instantaneous output voltage with the second reference voltage; and a controller connected to each of the first comparator and the second comparator, wherein the controller is configured to: receive the first output from the first comparator and the second output from the second comparator, and drive one or more drivers of a plurality of bi-directional drivers based on the first output and second output, and wherein the plurality of bi-directional drivers provide an output voltage.

In some example embodiments, a push-pull LDO voltage regulator circuit comprises: a reference voltage generator configured to: generate a first reference voltage, wherein the first reference voltage is greater than an output voltage by a first value, and generate a second reference voltage, wherein the second reference voltage is less than the output voltage by the first value, a first comparator connected to the reference voltage generator, wherein the first comparator is configured to: compare the first reference voltage with an instantaneous output voltage of the push-pull LDO voltage regulator, and provide a first output based on comparing the first reference voltage with the instantaneous output voltage; a second comparator connected to the reference voltage generator, wherein the second comparator is configured to: compare the second reference voltage with the instantaneous output voltage of the push-pull LDO voltage regulator, and provide a second output based on comparing the second reference voltage with the instantaneous output voltage; and a controller connected to each of the first comparator and the second comparator, wherein the controller is configured to drive one or more bi-directional drivers of a plurality of bi-directional drivers based on the first output and second output, and wherein the plurality of bi-directional drivers provide the output voltage.

In accordance with example embodiments, a method of providing a predetermined output voltage, comprises: comparing the instantaneous output voltage of a push-pull Low Dropout (LDO) voltage regulator with a first reference voltage; providing a first output based on comparing the first reference voltage with the instantaneous output voltage; comparing the instantaneous output voltage of the push-pull LDO voltage regulator with a second reference voltage; providing a second output based on comparing receive the instantaneous output voltage with the second reference voltage; and driving one or more bi-directional drivers of a plurality of bi-directional drivers of the push-pull LDO voltage regulator based on the first output and the second output, and wherein the plurality of bi-directional drives provide the predetermined output voltage.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A push-pull Low Drop Out (LDO) voltage regulator, comprising a first comparator configured to:

compare an instantaneous output voltage of the push-pull LDO voltage regulator with a first reference voltage, and provide a first output based on comparing the first reference voltage with the instantaneous output voltage;

a second comparator configured to:

compare the instantaneous output voltage of the push-pull LDO voltage regulator with a second reference voltage, and provide a second output based on comparing the instantaneous output voltage with the second reference voltage; and a controller connected to each of the first comparator and the second comparator, wherein the controller is configured to:

receive the first output from the first comparator and the second output from the second comparator, and drive one or more bi-directional drivers of a plurality of bi-directional drivers based on the first output and second output, and wherein the plurality of bi-directional drivers provide an output voltage.

2. The push-pull LDO voltage regulator of claim 1, wherein the first reference voltage is greater than the output voltage by a first value.

3. The push-pull LDO voltage regulator of claim 1, wherein the second reference voltage is lesser than the output voltage by a first value.

4. The push-pull LDO voltage regulator of claim 1, further comprising:

a reference voltage generator connected to each of the first comparator and the second comparator, wherein the reference voltage generator is configured to:

generate the first reference voltage, and generate the second reference voltage.

5. The push-pull LDO voltage regulator of claim 1, wherein the controller being configured to drive the one or more bi-directional drivers of the plurality of bi-directional drivers comprises the controller being configured to configure the one or more bi-directional drivers of the plurality of bi-directional drivers to sink current to pull down the instantaneous output voltage when the instantaneous output voltage is greater than both the first reference voltage and the second reference voltage.

6. The push-pull LDO voltage regulator of claim 1, wherein the controller being configured to drive the one or more bi-directional drivers of the plurality of bi-directional drivers comprises the controller being configured to configure the one or more bi-directional drivers of the plurality of bi-directional drivers to source current to pull up the instantaneous output voltage when the instantaneous output voltage is lower than both the first reference voltage and the second reference voltage.

7. The push-pull LDO voltage regulator of claim 1, wherein the controller being configured to drive the one or more bi-directional drivers of the plurality of bi-directional drivers comprises the controller being configured to not drive any bi-directional drivers of the plurality of bi-directional drivers when the instantaneous output voltage is greater than the second reference voltage but lower than the first reference voltage.

8. The push-pull LDO voltage regulator of claim 7, wherein the controller is further configured to reset each of the plurality of bi-directional drivers.

9. The push-pull LDO voltage regulator of claim 1, wherein the controller being configured to drive the one or more bi-directional drivers of the plurality of bi-directional drivers comprises the controller being configured to drive a predetermined number of bi-directional drivers of the plurality of bi-directional drivers.

10. A push-pull Low Drop Out (LDO) voltage regulator, comprising:

a reference voltage generator configured to:

generate a first reference voltage, wherein the first reference voltage is greater than an output voltage by a first value, and generate a second reference voltage, wherein the second reference voltage is less than the output voltage by the first value, a first comparator connected to the reference voltage generator, wherein the first comparator is configured to:

compare the first reference voltage with an instantaneous output voltage of the push-pull LDO voltage regulator, and provide a first output based on comparing the first reference voltage with the instantaneous output voltage;

a second comparator connected to the reference voltage generator, wherein the second comparator is configured to:

compare the second reference voltage with the instantaneous output voltage of the push-pull LDO voltage regulator, and provide a second output based on comparing the second reference voltage with the instantaneous output voltage; and a controller connected to each of the first comparator and the second comparator, wherein the controller is configured to drive one or more bi-directional drivers of a plurality of bi-directional drivers based on the first output and second output, and wherein the plurality of bi-directional drivers provide the output voltage.

11. The push-pull LDO voltage regulator of claim 10, wherein the controller being configured to drive the one or more bi-directional drivers of the plurality of bi-directional drivers comprises the controller being configured to configure the one or more bi-directional drivers of the plurality of bi-directional drivers to sink current to pull down the instantaneous output voltage when the instantaneous output voltage is greater than both the first reference voltage and the second reference voltage.

12. The push-pull LDO voltage regulator of claim 10, wherein the controller being configured to drive the one or more bi-directional drivers of the plurality of bi-directional drivers comprises the controller being configured to configure the one or more bi-directional drivers of the plurality of bi-directional drivers to source current to pull up the instantaneous output voltage when the instantaneous output voltage is lower than both the first reference voltage and the second reference voltage.

13. The push-pull LDO voltage regulator of claim 10, wherein the controller being configured to drive the one or more bi-directional drivers of the plurality of bi-directional drivers comprises the controller being configured to not drive any bi-directional drivers of the plurality of bi-directional drivers when the instantaneous output voltage is greater than the second reference voltage but lower than the first reference voltage.

14. The push-pull LDO voltage regulator of claim 13, wherein the controller is further configured to reset each of the plurality of bi-directional drivers.

15. The push-pull LDO voltage regulator of claim 10, wherein the controller being configured to drive the one or more bi-directional drivers of the plurality of bi-directional drivers comprises the controller being configured to drive a predetermined number of bi-directional drivers of the plurality of bi-directional drivers.

16. A method of providing an output voltage, the method comprising:

comparing an instantaneous output voltage of a push-pull Low Dropout (LDO) voltage regulator with a first reference voltage;

providing a first output based on comparing the first reference voltage with the instantaneous output voltage;

comparing the instantaneous output voltage of the push-pull LDO voltage regulator with a second reference voltage;

providing a second output based on comparing the instantaneous output voltage with the second reference voltage; and driving one or more bi-directional drivers of a plurality of bi-directional drivers of the push-pull LDO voltage regulator based on the first output and the second output, and wherein the plurality of bi-directional drives provide the output voltage.

17. The method of claim 16, further comprising:

generating the first reference voltage, wherein the first reference voltage is greater than the output voltage by a first value; and generating the second reference voltage, wherein the second reference voltage is lower than the output voltage by the first value.

18. The method of claim 16, wherein driving the one or more bi-directional drivers of the plurality of bi-directional drivers of the push-pull LDO voltage regulator based on the first output and the second output comprises generating, based on the first output and the second output, one of the following:

a source signal; and a sink signal.

19. The method of claim 16, wherein driving the one or more bi-directional drivers of the plurality of bi-directional drivers of the push-pull LDO voltage regulator based on the first output and the second output comprises driving a predetermined number of bi-directional drivers of the plurality of bi-directional drivers based on the first output and the second output.

20. The method of claim 19, wherein driving a predetermined number of bi-directional drivers of the plurality of bi-directional drivers based on the first output and the second output comprises increasing the predetermined number of bi-directional drivers of the plurality of bi-directional drivers in a subsequent comparison.

* * * * *